United States Patent [19]

Pez

[11] 4,228,060
[45] Oct. 14, 1980

[54] POLYMERIZATION OF ACETYLENE

[75] Inventor: Guido Pez, Boonton, N.J.

[73] Assignee: Allied Chemical Corporation, Morris Township, Morris County, N.J.

[21] Appl. No.: 957,276

[22] Filed: Nov. 3, 1978

[51] Int. Cl.$^2$ .......................... C08F 4/76; C08F 38/02; C08K 5/01; C08K 5/15

[52] U.S. Cl. .......................... 260/30.4 R; 260/32.6 R; 260/33.2 R; 260/33.6 UA; 525/1; 526/170; 526/285

[58] Field of Search .............................. 526/170, 285; 260/30.4 R, 32.6 R, 33.2 R, 33.6 UA

[56] References Cited

U.S. PATENT DOCUMENTS

| | | | |
|---|---|---|---|
| 2,922,803 | 1/1960 | Kaufman | 526/170 |
| 3,046,288 | 7/1962 | Sloan et al. | 526/170 |
| 3,051,693 | 8/1962 | Leto | 526/170 |
| 3,119,799 | 1/1964 | Natta et al. | 526/285 |
| 3,271,378 | 9/1966 | Daniels | 526/285 |
| 3,505,369 | 4/1970 | Deffner | 526/170 |

Primary Examiner—Harry Wong, Jr.
Attorney, Agent, or Firm—Robert A. Harman

[57] ABSTRACT

A process is described for producing partially crystalline polyacetylene in the cis or trans configurations utilizing $\mu$-($\eta^1$:$\eta^5$-cyclopentadienyl)-tris($\eta$-cyclopentadienyl)dititanium(Ti-Ti) catalyst. The resulting polyacetylene when "doped" with halogen additives is useful as an electrical conductor or semiconductor. Also described are polyacetylene "gels," consisting essentially of a solid polyacetylene and gel-forming liquid therefor, also containing up to about 10 percent by weight of catalyst, per weight of acetylene, which is used for production of the polyacetylene. The gels are stable to phase separation at room temperature in a closed system, and are useful in preparing randomly and partially chain-aligned polyacetylene films and articles.

7 Claims, No Drawings

POLYMERIZATION OF ACETYLENE

BACKGROUND OF THE INVENTION

1. Field of the Invention

This invention relates to a novel process for preparing partially crystalline polyacetylene in the cis or trans configurations by polymerizing acetylene in the presence of a $\mu$-($\eta^1$:$\eta^5$-cyclopentadienyl)-tris($\eta$-cyclopentadienyl)dititanium (Ti-Ti) catalyst and also to stable polyacetylene "gel" compositions produced from the process comprised of a polyacetylene, and gel-forming liquid therefor.

2. Brief Description of the Prior Art

Partially crystalline forms of polyacetylene, in the cis or trans configurations, when "doped" with a controlled amount of an electron-attracting species such as a halogen-containing compound, like iodine or arsenic pentafluoride, are known to exhibit increases in conductivity over a remarkably wide range of up to about 11 magnitudes. See *J. Am. Chem. Soc.* Vol. 100, 1013–1015 (1978), *Chemical and Engineering News*, pp. 19–20 (April 14, 1978), *J. Chem. Phys.* 68, pp. 5405–5409 (1978) and *J. Chem. Phys.* 69, pp. 106–111 (1978). The "doped" polymers are capable of functioning as electrical conductors or semiconductors.

Catalytic methods for synthesizing polyacetylene in its respective cis and trans configurations are well known in the art and include the use of Ziegler-type catalysts, described for example in *J. Poly. Sci. Polymer Chem. Ed.* 2, Vol. 12, pp. 11–20 (1974); the use of copper-aluminum spinel solids, as described in *Kinet. Katal.* 12 (4), 974 (1971), *Chem. Abstr.* 76, 15005Y (1972); and the use of dicyclopentadienyl vanadium as described in Japanese Pat. No. 70 08,980 (1970), *Chem. Abstr.* 73, 67036s (1970).

The reference *Bull. Chem. Soc. Japan*, 38, 859–860 (1965) describes a method for polymerizing acetylene which involves a "titanocene"-type catalyst. However, subsequent work by others in *J. Am. Chem. Soc.*, Vol. 92, pp. 6182–6185 (1970), disclosed that the above "titanocene" material, as prepared by reduction of bis dicyclopentadienyl titanium dichloride with sodium amalgam, actually used as a catalyst, was in fact a dimer of cyclopentadienyl fulvalene titanium hydride.

The references of Guido Pez in *J. Am. Chem. Soc.* 98, 8072 (1976), U.S. Pat. No. 3,776,932 (1973), Re 29,368 (1977) and U.S. Pat. No. 4,024,169 (1977), Allied Chemical being the assignee, disclose a novel cyclopentadienyl titanium compound, being $\mu$-($\eta^1$:$\eta^5$-cyclopentadienyl)-tris($\eta$-cyclopentadienyl)dititanium(Ti-Ti), for removing nitrogen gas from a mixture of nitrogen and argon. However no specific mention is made of the possibility of using the compounds as catalysts in the polymerization of acetylene.

There is a continuing need for new, inexpensive and conveniently prepared catalysts which will reproducibly polymerize acetylene into its respective cis and trans partially crystalline forms, useful as starting materials for preparing electrical conductors.

The reference, *J. Poly. Sci.*, Part A-1, Vol. 7(12), pp. 3419–3425 (1969) describes a gel produced during the polymerization of acetylene using an iron dimethylglyoxime-2-pyridine/triethyl aluminum catalyst in which the weight of combined catalyst present is greater than the weight of polyacetylene produced, on a dry basis. No specific working properties of the gel is described and a solid polymer is recovered therefrom.

There is a continuing need in the art for formulations of polyacetylene which can be easily and conveniently fabricated into articles in which the polyacetylene is partially chain-aligned. Solid polyacetylene produced by conventional methods is generally intractable and insoluble in known solvents which renders the fabrication into isotropic, or anisotropic, i.e., partially chain-aligned, articles difficult.

SUMMARY OF THE INVENTION

We have unexpectedly found that $\mu$-($\eta^1$:$\eta^5$-cyclopentadienyl)-tris($\eta$-cyclopentadienyl)dititanium(Ti-Ti) catalyst, and nitrogen complexes thereof, described above in the references of Guido Pez, are excellent catalysts in a novel process for the preparation of partially crystalline polyacetylene and geometrical isomers thereof.

In addition, we have unexpectedly found that stable polyacetylene "gels" can be formed in the process, consisting essentially of a polyacetylene and a gel-forming liquid therefor, and containing a minimum of catalyst, by conducting the polymerization of acetylene, in the quiescent state, i.e., in the absence of agitation. The resulting "gels" can be easily fabricated by conventional techniques into articles in which the polyacetylene structure is partially oriented.

In accordance with this invention, there is provided a process for producing polyacetylene comprising contacting acetylene with a mixture comprised of $\mu$-($\eta^1$:$\eta^5$-cyclopentadienyl)-tris($\eta$-cyclopentadienyl)dititanium (Ti-Ti) catalyst, or nitrogen adduct complexes thereof, in an inert organic solvent therefor, at a temperature of about $-120°$ to $+250°$ C., under a pressure of about 0.0001 to 50 atmospheres, substantially in the absence of elemental oxygen and water.

Further provided is a composition comprising a polymeric gel consisting essentially of a polyacetylene and a gel-forming liquid therefor, containing up to a maximum of about 10 weight percent catalyst per weight of polyacetylene, in the composition, on a dry basis, said catalyst being used in the preparation of said polyacetylene, said gel being stable to phase separation at about 25° C., in a closed system.

In addition, there is provided a randomly oriented film, a partially chain-aligned dimensionally stable film and an article of manufacture produced from the above-described polymeric "gel."

DESCRIPTION OF THE INVENTION AND PREFERRED EMBODIMENTS

The novelty of this invention process resides in the discovery that the novel compound, $\mu$-($\eta^1$:$\eta^5$-cyclopentadienyl)-tris($\eta$-cyclopentadienyl)dititanium (Ti-Ti), hereinafter referred to as "catalyst" or "dicyclopentadienyl dititanium compound," herein, developed by Guido Pez and described in the above-identified references, hereby incorporated by reference, is a specific material useful as a catalyst in the polymerization of acetylene.

A full description of the catalyst composition, its physical properties, structure, is nitrogen adducts and solvent complexes thereof, and methods of synthesis are fully and adequately described in the above-identified references, and for the sake of brevity need not be discussed herein, except to state that nitrogen adducts and solvent complexes thereof, such as that of tetrahydrofuran, are also included in the term "catalyst" and are considered to be equivalents thereof.

The invention process comprises dissolving the "catalyst" in a stirred solvent therefor, under conditions rigorously excluding elemental oxygen and water. Gaseous acetylene is then introduced into the system to "blanket" the liquid reaction mixture and to facilitate the "contacting" step, i.e., the absorption of acetylene by the mixture. Alternately, the acetylene can be "bubbled" into the reaction mixture. The polymerization proceeds at a desired temperature, between $-120°$ to $+250°$ C., under adequate agitation and is allowed to proceed until the desired amount of acetylene is absorbed as indicated by a measurable decrease in the reaction pressure, after allowing for dissolution of the acetylene in the solvent. The solvent and unused acetylene are then distilled off under reduced pressure and the resulting solid residue, being either a solid or a powder, is washed with solvent. The resulting solid or powder can be fabricated into a suitable structure, such as a rectangular solid capable of being "doped" with, for example, iodine to function as a semiconductor or conductor as described in the above reference. Conducting the process at low temperatures, from about $-110°$ to $-60°$ C., favors the formation of the cis geometrical isomer of polyacetylene, and higher temperatures, from about $60°$ to $200°$ C., favors the formation of the trans geometrical isomer of polyacetylene.

The above-discussed cis and trans "forms," or configurations, of partially crystalline polyacetylene are known in the art, as discussed in the above-described reference of *J. Poly. Sci. Polymer Chem. Ed. Vol.* 12, pp. 11–20 (1974). As bulk solids they are normally dark red or black in color and as films they are silvery, copper-colored or yellow, wherein the resultant color effects are due to the light reflection from the unsaturated polymer chains, are randomly oriented as evidenced by the fact that changes in the angle of incidence do not result in changes in the X-ray diffraction pattern therein, and can be conveniently distinguished from one another on the basis of their infrared spectra. Specifically, the cis form exhibits a characteristic C—H out-of-plane deformation band at 740 cm$^{-1}$ while the trans form exhibits a characteristic C—H out-of-plane deformation band at 1015 cm$^{-1}$. Mixtures of cis and trans forms can be estimated as to their relative weight percent in a mixture of the two by comparing the relative amplitudes of the respective deformation bands of each form relative to known standards by the method as described in the immediate above-identified reference.

By the term "cis" form, as used herein, is meant that the partially crystalline polyacetylene obtained in the process contains at least about 70 weight percent of the cis configuration, the remainder being in the trans configuration. By the term "trans form," as used herein, is meant that the crystalline polyacetylene obtained in the process contains at least about 70 weight percent of polyacetylene in the trans configuration, the remainder being in the cis form.

The physical properties of the cis and trans forms are adequately described in the above-identified reference and for the sake of brevity need not be reiterated here.

By the term partially "crystalline polyacetylene," as used herein, is meant that the obtained polyacetylene exhibits an intense and sharp reflection at a Bragg angle ($2\theta$) of 23° to 24°, corresponding to an inner planar spacing of 3.8–3.5 angstroms as determined by Cu K-alpha X-radiation, and does not exhibit amorphous scattering.

The inert liquid organic solvent used in the process must be anhydrous and not contain gaseous oxygen and must be a suitable solvent for acetylene at the temperature of the polymerization and also a suitable solvent for the catalyst during the process. By the term "suitable" is meant that a sufficient amount of material is dissolved in the solvent to initiate and maintain the course of the polymerization. Representative classes of suitable solvents useful in the process include $C_6$–$C_{14}$ aromatic hydrocarbons, $C_5$–$C_{18}$ linear or branched acyclic or cyclic saturated aliphatic hydrocarbons, $C_4$–$C_6$ saturated aliphatic cyclic mono or diethers, $C_2$–$C_6$ linear or branched saturated aliphatic acyclic mono- or diethers, $C_7$–$C_{10}$ aromatic mono- or diethers, $C_3$–$C_8$ linear or branched saturated aliphatic tertiary amines, $C_5$–$C_8$ cyclic mono-olefins, $C_4$–$C_{12}$ linear or branched alpha-olefins, or mixtures thereof.

Representative examples of specific solvents include toluene, hexane, tetrahydrofuran, p-dioxane, diethyl ether, 1,2-dimethoxyethane, anisole, n-hexadecane, cyclohexane, triethylamine, cyclohexene, hexene, or mixtures thereof. Preferred solvents in the process are hexane and toluene.

The amount of solvent used in the process is related to the molar amount of catalyst used. In general, 0.003 to 1 mole of catalyst per liter of solvent may be used. However, the amount of solvent is not critical, and larger or smaller amounts may be used as long as sufficient solvent is present to dissolve a sufficient amount of catalyst and acetylene, to initiate and maintain the polymerization reaction. It is preferred to use about 0.03 to 3 millimoles of catalyst per liter of solvent and particularly preferred is the range of about 0.4 to 1.2 millimoles of catalyst per liter of solvent.

The amount of catalyst used described above is also related to the amount of polyacetylene produced in terms of its "catalyst turnover number." By the term "catalyst turnover number" is meant the grams of polymer produced per gram of catalyst employed. Usually, depending upon the reaction conditions, and in the absence of poisoning effects, the turnover number for the "catalyst" is about 30–100, i.e. 30 to 100 grams of polyacetylene produced per gram of catalyst initially present in the reaction medium. Thus, yields of polyacetylene in the process are also a function of the "catalyst turnover number" and are generally in the range of about 30 to 100 parts of polymer per part of catalyst.

The catalyst may also optionally be used in combination with a "co-catalyst" as an aid in increasing the yield and efficiency of the polymerization. It is to be understood that the co-catalyst is simply a supporting aid in the process and is not the primary source of catalytic activity. Representative co-catalysts that may be used are the aluminum alkyls, such as triethyl aluminum or tri(n-butyl) aluminum, and the like. The amount of co-catalyst, if used, is preferably about 0.1 to 3 parts of co-catalyst by weight per part of catalyst.

Acetylene is the limiting reagent in the process and the amount used is generally measured in terms of pressure, convertible to moles by the ideal gas equation, at the start of the polymerization and is generally in the range of about 1 to 5 atmospheres assuming an atmosphere consisting essentially of acetylene, or its molar equivalent at reduced pressures. The amount of acetylene used is dependent upon the size of the apparatus and other factors, and the total calculated amount of acetylene, used in the reaction, can be present at the beginning of the reaction or can be continuously monitored into the reaction solution during the process. Various grades of acetylene can be used, commercial, technical, etc., with the proviso that air and moisture and contaminant acetone or other polar or acidic contaminants, are rigidly excluded from the acetylene feed stream prior to introduction into the reaction solution. The acetylene can be added at a temperature from about $-80°$ to $+250°$ C., and preferably is added at room temperature.

The "contacting" of the mixture of the dissolved catalyst and solvent with acetylene is generally accomplished by contact of an atmosphere of gaseous acetylene with the surface of the mixture. Upon contact, the acetylene is absorbed, dissolves in the mixture, and undergoes polymerization in the presence of the catalyst. The "atmosphere" of acetylene can be substantially all acetylene, or can be a mixture of acetylene and an inert gas, such as argon. Sufficient acetylene must be present to initiate and maintain the polymerization process.

The process is conducted in the temperature range of from about $-120°$ C. to $+200°$ C. Preferred temperature range for producing mainly the cis form is from about $-110°$ to $-60°$ C. and particularly preferred is the range from about $-90°$ to $-80°$ C. Preferred temperature range for producing mainly the trans form is from about $60°$ to $200°$ C. and particularly preferred is the range from about $80°$ to $100°$ C. Process temperatures between these preferred ranges tend to result in mixtures of the cis and trans forms in various weight ratios. In general, due to the greater stability of the trans form, and the tendency of the cis form to undergo isomerization, obtained polyacetylene, mainly in the cis form will always contain some of the trans isomer.

The process can be conducted under a pressure of from about 1 to 50 atmospheres and preferably about 1-10 atmospheres, or at a reduced pressure below atmospheric down to about 0.0001 atmospheres, with the proviso that sufficient pressure is present to aid in the absorption of acetylene by the reaction medium. Preferred pressure in the process is about 1 atmosphere.

The process must be conducted under conditions rigorously excluding elemental oxygen and water. Any conventional type of apparatus meeting these requirements can be used. The inventor utilized an evacuable glass apparatus on a laboratory scale with a means for excluding air and moisture, a means for introducing acetylene and starting materials, a means for stirring of the reaction mixture, means for heating and cooling and means for isolating and collecting product. Commercial scale-up units useful on a plant scale can also be utilized, meeting these requirements, and will be obvious to one skilled in the art.

An alternate embodiment of the process is directed to conducting the invention process, subject to the limitations described above, but in addition in the absence of agitation during the polymerization, i.e. wherein the reaction mixture is in the quiescent state, thereby resulting in "polymeric gels" of polyacetylene, containing "catalyst." These compositions are of the class of compositions, "polymeric gels," also a subject of this invention. Details of this embodiment, as well as details for producing randomly and partially chain-aligned films from these polymeric gels are discussed below.

The subject compositions of this invention comprise polymeric gels consisting essentially of a polyacetylene and a gel-forming liquid therefor. In addition the gels contain up to a maximum of about 10 weight percent catalyst per weight of polyacetylene, in the composition on a dry basis, said catalyst being used in the preparation of said polyacetylene. The gel is capable of maintaining its structural integrity, i.e. being stable to phase separation, and not separating into distinct liquid and solid phases at room temperature, at about $25°$ C., in the absence of evaporation of the gel-forming liquid, i.e., in a closed system. By the term "gel," as used herein, is meant a physical state of matter approaching that of a colloidal form of a solid in a liquid matrix, wherein the solid polymer, being the disperse phase, is combined with a continuous phase, the gel-forming liquid, producing a viscous, jelly-like product. As stated in "Condensed Chemical Dictionary" by Gessner G. Hawley, Eighth Edition, 1971, Van Nostrand Reinhold, p. 412, "a gel is made by cooling a solution, whereupon certain kinds of solutes (gelatin) form submicroscopic crystalline particle groups which retain much solvent in the interstices." The subject gel compositions contain a fairly stable structure of polymer chains held together in a continuously dispersed manner by attractive bonding forces formed with the gel-forming liquid. The resulting "gel" compositions do not separate into distinct liquid and solid phases, in the absence of evaporation of the swelling agent at room temperature, i.e. at about $25°$ C. Thus, the gels, once prepared, must be stored in closed systems, e.g. closed glass vessels, prior to use.

The subject gel compositions can be produced by the invention process described herein, utilizing $\mu$-($\eta^1$:$\eta^5$-cyclopentadienyl)-tris($\eta$-cyclopentadienyl)dititanium(-Ti-Ti) catalyst, wherein the reaction is conducted in the quiescent state, i.e., in the absence of agitation.

The limitation with respect to the catalyst is that up to a maximum of about 10 weight percent of said catalyst, and in the preparation of the polyacetylene, may be present in the resulting polymeric gel, based on the amount of polyacetylene present in the gel on a dry basis. Generally, about 0.3 to 5 weight percent of catalyst, based on the dry polyacetylene content of the gel, is present, and usually about 2 weight percent. Preferably, the least amount of catalyst present in the resulting gel is desired. It is considered that nearly all of the catalyst could be removed by continuous solvent extraction of the gel, as for example in a Soxhlet-type apparatus. The weight limitation on the catalyst is due to the fact that catalyst comcentrations above 10 weight percent, as defined above, lead to films produced therefrom containing an undesirable amount of extraneous metal and are thus not useful. Preferred catalyst present remaining in the gel is $\mu$-($\eta^1$:$\eta^5$-cyclopentadienyl)-tris($\eta$-cyclopentadienyl)dititanium (Ti-Ti).

The polyacetylene present in the gel compositions may be mainly in the cis or trans configuration, or mixtures thereof, which are described hereinabove. The gels containing mainly the cis form or trans forms of polyacetylene, can easily be prepared via the subject invention process. For example, by conducting the process in a temperature range of abut $-110°$ to $-60°$ C., and preferably at about $-80°$ C., in the absence of agitation, gels containing mainly the cis form are produced. Similarly, gels containing mainly the trans form can be prepared by conducting the process in the temperature range of from about $0°$ to $200°$ C. and preferably at about $80°$ to $100°$ C., in the absence of agitation. Polyacetylene is present in the polymeric gel in an amount of about 0.001 to about 99 weight percent of the gel and preferably in amount of about 10 weight percent of the gel.

The gel-forming liquid for the polyacetylene may be any solvent used in the invention process, general classes and specific examples of which are described hereinabove, and the term "gel-forming" is used to distinguish the function of the solvent in the gel from its function in the polymerization process. The reason why the liquid solvent is also suitable as the gel-forming liquid is not clearly understood. An adequate discussion of solvents that may also function a gel-forming liquids is given hereinabove in the description of suitable solvents in the invention process.

The amount of solvent present in the gel is the weight of the gel minus the total combined weights of polyacetylene and catalyst and is in the range of about 10 to 95 weight percent of the composition.

The volume of the polymeric gels produced is roughly equivalent to the volume of solvent used and in most cases will be slightly less. For example, if 250 ml. of solvent is used, in which the polyacetylene dry content of the gel is about one gram, the volume of the resulting gel will usually be about 200 ml.

The subject polyacetylene gels of this invention, produced by the invention process in the absence of agitation, are useful in forming relatively uniform films in which the polyacetylene chains are either randomly oriented, with respect to one another, and thus, isotropic, or partially chain-aligned and thus, anisotropic. The resulting uniform fims are also useful when "doped" as electrical conductors or semiconductors. However, conducting the invention process in the presence of agitation does not reproducibly result in the production of uniform films, but yields mostly solid polyacetylene, described hereinabove, which is useful in fabricating larger solid components, for example, circular pellets, by compression molding techniques. Suitable doping of these components then gives solid electrical conductors.

However, we have found that randomly oriented polyacetylene films, after similar doping, generally have higher conductivities than the doped compressed solid polyacetylene samples described above. The reason for this may be that in the continuous films there is a longer mean chain length and thus a larger electrical conductivity path than in the compressed solid polymer samples. Thus, the continuous films after suitable doping, have a greater range of utility as semiconductors or conductors, as will be obvious to anyone skilled in the art, from this disclosure.

The randomly oriented films, also a subject of this invention, are produced by allowing solvent to evaporate from the gel compositions as by slow evaporation or evaporation of solvent under reduced pressure, such that about 70-90 weight percent of the solvent is removed. It is preferred to conduct the removal of solvent at room temperature or below, such that a slow uniform rate of evaporation is achieved. Rapid removal of solvent or removal at temperatures significantly above room temperature, e.g. 50° C., tend to result in non-uniform films, with respect to crystallinity and electrical conducting properties. It is considered that the resulting gel-based films, being randomly oriented, are substantially crystalline and that this property leads to good electrical conductivities when the films are "doped" with additives such as iodine.

The polymeric gels described above can furthermore be subjected to simple mechanical stress, in a longitudinal manner, under ambient temperature and atmospheric pressure conditions, in an atmosphere of solvent vapor, to obtain "partially chain-aligned" dimensionally stable polyacetylene films, which are stable in the stretched form, also a subject of this invention. By the term "partially chain-aligned", is meant that a certain degree of axial "ordering" of the polymer chains has occurred in a particular direction which can be evidenced by X-ray diffraction measurements. By the term "stretched" and "stretched form" is meant that a longitudinal stress has been applied to the film resulting in a stable extended shape, compared to the unstretched original. By the term "dimensionally stable" is meant that after the sample has been subjected to stress and uniformly dried, the sample retains it shape, with respect to length, width and thickness, in the absence of applied heat or added stress.

Mechanical stress can be applied to the gel by placing the gel on any conventional "stretching" device which will subject the film to longitudinal stress in a uniform manner, in monotonically increasing increments of applied stress. The stretching can be applied until maximum elongation of the film occurs, just prior to the breaking point, which can vary from sample to sample, and can be determined by one skilled in the art with very little experimentation.

The stretching is conducted under an atmosphere of solvent vapor, preferably using the solvent comprising the gel-forming liquid. After the stretching has been performed, the atmosphere of solvent vapor can slowly be replaced by an atmosphere of inert gas such as nitrogen and the like, to insure slow and uniform drying of the stretched film.

The stretched process is also preferably conducted under ambient temperature and pressure conditions, although not limited thereto.

The resulting stretched film is partially chain-aligned, as evidenced by its X-ray diffraction pattern and at room temperature is stable to "shrinkage," i.e. it exhibits no tendency to return to its non-stretched original state, and thus, in this respect, does not exhibit viscoelastic behavior.

The stretched, partially chain-aligned film, when "doped" with agents, such as iodine or arsenic pentafluoride, are excellent electrical conductors or semiconductors.

A further subject of the instant invention is an article of manufacture made from the polymeric gels, described above, and includes electrical components, such as semi-conductors, rectifiers, and the like, produced from the randomly oriented or stretched partially chain-aligned films described above. The articles can be made from the above-described gel by known, conventional methods.

The following examples are illustrative of the best mode of carrying out the invention as contemplated by us but should not be construed to be limitations on the scope and spirit of the instant invention.

EXAMPLE 1

Thirty mg of $\mu$-($\eta^1$:$\eta^5$-cyclopentadienyl)-tris($\eta$-cyclopentadienyl)dititanium(Ti-Ti) (as obtained directly from reduction of $(C_5H_5)_2TiCl_2$, described in *J. Am. Chem. Soc.* 98, pp. 8072 (1976), were dissolved in 250 ml of hexane. Highly purified acetylene (two liters at one atmosphere pressure) was placed over the rapidly stirred solution at room temperature in the absence of elemental oxygen and water. There was an immediate darkening of the solution and absorption of acetylene. Stirring was continued overnight, until there was no further significant decrease in the pressure of acetylene. Evaporation of the solvent from the resulting dark-red voluminous mass of solvent swollen polymer, yielded about 1 gram of metallic grey residue which appeared from its infrared spectrum to consist mainly of trans polyacetylene, as evidenced by the strong absorption band at 1015 cm$^{-1}$.

EXAMPLE 2

The above procedure in Example 1 was repeated except that the process was conducted at a temperature of about $-80°$ C. There was obtained about one gram of a metallic-grey solid. An infrared spectrum thereof indicated that the resulting polyacetylene was mainly the cis form, as evidenced by a strong absorption band at 740 cm$^{-1}$.

EXAMPLE 3

Gel Formation

The procedure of Example 2 was repeated except that no agitation was employed during the polymerization and toluene was used in place of hexane. After 24 hours, at $-80°$ C., the uptake of acetylene declined to a negligible amount, and about a 200 ml. volume of reddish-colored polyacetylene gel was formed in the round-bottomed flask on top of a 50 ml. layer of toluene. The flask at $-80°$ C. was subjected to vacuum to remove unreacted acetylene and when complete, the flask was warmed to room temperature. The layer of remaining toluene was removed by decantation and the remaining copper-colored gel washed with $5 \times 100$ portions of toluene under an inert atmosphere. The combined toluene layer and extracts, rapidly darkened upon exposure to air, indicating a significant amount of catalyst had been removed from the gel. The gel was stable at room temperature, at about 25° C., in a closed container, wherein the evaporation of toluene solvent was precluded.

Film Formation

Toluene was gradually removed from the above-prepared gel composition at room temperature under vacuum thereby producing about a 0.2 mm. thick grey-metallic or yellow-metallic circular polyacetylene film (being circular due to the shape of the flask). The film was comprised of about 86 weight percent of the cis form of polyacetylene, as evidenced by its infrared spectrum, and was randomly oriented as evidenced by its X-ray diffraction pattern.

EXAMPLE 4

A rerun of Example 3 was made, producing the gel. A sample of the gel, 5 cm. in diameter and 20 mm. thick, was subjected to vacuum to uniformly remove toluene solvent without causing any "localized" areas of drying, resulting in a film of 2 mm thickness. Approximately 70–90 weight percent of the toluene present in the initial gel was removed. A section of this resulting material, 3 cm.$\times 0.6$ cm.$\times 2$ mm, was subjected to longitudinal stretching on a mechanical "rack" device, under a toluene-saturated atmosphere at room temperature until maximum elongation was achieved prior to breaking. The toluene atmosphere was slowly replaced by an atmosphere of dry nitrogen and the resulting "dog-bone shaped" sample was then dried. The center of the sample was found to be highly chain-aligned cis polyacetylene as seen by optical, electron microscopy and X-ray diffraction measurements. The sample was found not to exhibit typical viscoelastic behavior, in that the dried stretched sample showed no tendency to "shrink" back to its original shape at room temperature, and thus was dimensionally stable.

The above-described polyacetylene compositions, produced by the invention process and modifications thereof, are useful when "doped" with electron-attracting agents such as AsF$_5$ or iodine to form materials useful as electrical conductors and semiconductors.

I claim:

1. A process for producing polyacetylene gel compositions comprising contacting acetylene with a mixture comprised of $\mu$-($\eta^1$:$\eta^5$-cyclopentadienyl) tris($\eta$-cyclopentadienyl)-dititanium (Ti-Ti) catalyst, or nitrogen adduct complexes thereof, in an inert organic solvent therefor, at a temperature of about $-120°$ to $+200°$ C., under a pressure of about 0.0001 to 50 atmospheres, substantially in the absence of elemental oxygen and water, said contacting being conducted in a quiescent state thereby resulting in the polyacetylene gel composition.

2. A composition comprising a polymeric gel consisting essentially of a polyacetylene and a gel-forming liquid therefor, being an inert organic solvent, and selected from C$_6$–C$_{14}$ aromatic hydrocarbons, C$_5$–C$_{18}$ linear or branched acyclic or cyclic saturated aliphatic hydrocarbons, C$_4$–C$_6$ saturated aliphatic cyclic mono- or diethers, C$_7$–C$_{10}$ aromatic mono- or diethers, C$_2$–C$_6$ linear or branched saturated aliphatic acylic mono- or diethers, C$_3$–C$_8$ linear or branched saturated aliphatic tertaryamines, C$_5$–C$_8$ cyclic mono- olefins, C$_4$–C$_{12}$ linear or branched alpha olefins, and mixtures thereof; said composition containing up to a maximum of about 10 weight percent of catalyst per weight of polyacetylene, said catalyst being $\mu$-($\eta^1$:$\eta^5$-cyclopentadienyl)-tris($\eta$-cyclopentadienyl) dititanium (Ti-Ti); said gel being stable to phase separation at about 25° C., in a closed system.

3. The composition of claim 2 wherein said polyacetylene is mainly in the cis configuration.

4. The composition of claim 2 wherein said polyacetylene is mainly in the trans configuration.

5. The composition of claim 2 wherein said polyacetylene is present in an amount of about 10 wt. percent of the polymeric gel.

6. The composition of claim 1 wherein said gel-forming liquid is toluene, hexane, tetrahydrofuran, dioxane, diethyl ether, 1,2-dimethoxyethane, anisole, n-hexadecane, cyclohexane, cyclohexene, hexene, or mixtures thereof.

7. The composition of claim 2 wherein said catalyst is present in an amount of about 2 weight percent per weight of polyacetylene in the composition on a dry basis.

* * * * *

UNITED STATES PATENT AND TRADEMARK OFFICE
CERTIFICATE OF CORRECTION

PATENT NO. : 4,228,060
DATED : October 14, 1980
INVENTOR(S) : Guido Pez

It is certified that error appears in the above-identified patent and that said Letters Patent are hereby corrected as shown below:

Claim 6, line 55, "The composition of Claim 1" should read -- "The composition of Claim 2" --

Signed and Sealed this

Tenth Day of March 1981

[SEAL]

Attest:

RENE D. TEGTMEYER

Attesting Officer     Acting Commissioner of Patents and Trademarks